United States Patent [19]

Kurihara

[11] Patent Number: 5,120,593

[45] Date of Patent: Jun. 9, 1992

[54] VEHICULAR ROOF STRUCTURE

[75] Inventor: Toshiyuki Kurihara, Tochigi, Japan

[73] Assignee: Honda Giken Kogyo Kabushiki Kaisha, Tokyo, Japan

[21] Appl. No.: 349,115

[22] Filed: May 9, 1989

[30] Foreign Application Priority Data

May 9, 1988 [JP] Japan .................. 63-112109
May 9, 1988 [JP] Japan .................. 63-112110
May 10, 1988 [JP] Japan .................. 63-112777

[51] Int. Cl.⁵ .............................. B32B 1/00; B60J 7/00
[52] U.S. Cl. ................................. 428/174; 428/68; 428/72; 428/178; 428/192; 428/304.4; 428/212; 296/210; 296/211; 296/214
[58] Field of Search ............ 296/210, 211, 214; 428/156, 72, 74, 157, 158, 159, 160, 166, 304.4, 318.8, 192, 542.2, 68, 131, 137; 181/284, 286, 288, 290, 291, 292, 293, 294

[56] References Cited

U.S. PATENT DOCUMENTS 2,823,951  2/1958  Stahl ........................ 296/214
4,256,797  3/1981  Stamper et al. ........... 296/214

FOREIGN PATENT DOCUMENTS

56-80450  7/1981  Japan .
0214033   9/1987  Japan ........................ 296/214

Primary Examiner—Ellis P. Robinson
Assistant Examiner—Donald J. Loney
Attorney, Agent, or Firm—Irving M. Weiner; Joseph P. Carrier; Pamela S. Burt

[57] ABSTRACT

A vehicular roof structure which has no roof arches includes a roof panel having reinforcing frames on peripheral edges thereof and a curved lower surface having a radius $R_1$ of curvature, a roof lining having a curved upper surface having a radius $R_2$ of curvature, the roof lining being of a laminated structure comprising a support layer having a number of cells, a covering layer covering surfaces of the support layer, and a decorative layer disposed on a lower surface of the covering layer, and a vibration-damping layer having a substantially uniform thickness t and held between and closely against the upper surface of the roof lining and the lower surface of the roof panel, the radii $R_1$, $R_2$ of curvature and the thickness t meeting the relationship: $R_2 \leq R_1 - t$, the roof lining having peripheral edges fixed to the reinforcing frames of the roof panel.

10 Claims, 6 Drawing Sheets

VEHICULAR ROOF STRUCTURE

BACKGROUND OF THE INVENTION

1. Field of the Invention

The present invention relates to a vehicular roof structure with no roof arches.

2. Description of the Relevant Art

Known vehicular roof structures generally comprise a roof panel, metallic roof arches supporting the roof panel, and a roof lining. There has recently been proposed a laminated roof lining, as disclosed in Japanese Laid-Open Patent Publication No. 56-80450, the laminated roof lining being devoid of any roof arches serving as a support frame for a roof panel, thus making the roof lightweight. The laminated roof lining is also effective in insulating sounds which would otherwise enter the passenger compartment. The conventional roof lining comprises a decorative layer made of a resin sheet or the like which is permeable to air, a support layer made of cardboard or the like and having a multiplicity of cells, and a covering layer made of an air-permeable resin or the like.

Heretofore, the laminated roof lining has been shaped to the inner surface configuration of the roof panel, and the entire upper surface of the laminated roof lining is bonded to the roof panel by an adhesive. However, the roof panel with the laminated roof lining thus bonded is not capable of sufficiently damping applied vibrations, and does not render the entire roof rigid enough. Further, the solidified adhesive cannot be peeled off easily, and the covering layer is made of a material which is not easily rupturable. Therefore, the prior roof lining is difficult to remove and hence cannot easily be serviced when the roof panel is to be repaired or the roof lining is to be replaced.

SUMMARY OF THE INVENTION

It is an object of the present invention to provide a vehicular roof structure which makes a vehicular roof lightweight without employing any roof arches, provides a better sound insulation for the passenger compartment, and dampens vibrations applied to a roof panel to increase the rigidity of the roof.

Another object of the present invention is to provide a vehicular roof structure which allows a laminated roof lining to be easily attached to and detached from a roof panel, to thereby permit the roof structure to be well serviced when the roof panel is to be repaired or the roof lining is to be replaced.

According to the present invention, a vehicular roof structure includes a roof panel having reinforcing frames on peripheral edges thereof and a curved lower surface having a radius $R_1$ of curvature, a roof lining having a curved upper surface having a radius $R_2$ of curvature. The roof lining is of a laminated structure comprising a support layer having a number of cells, a covering layer covering surfaces of the support layer, and a decorative layer disposed on a lower surface of the covering layer, and a vibration-damping layer having a substantially uniform thickness t and held between and closely against the upper surface of the roof lining and the lower surface of the roof panel, the radii $R_1$, $R_2$ of curvature and the thickness t meet the relationship: $R_2 \leq R_1 - t$. The roof lining having peripheral edges fixed to said reinforcing frames of the roof panel.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
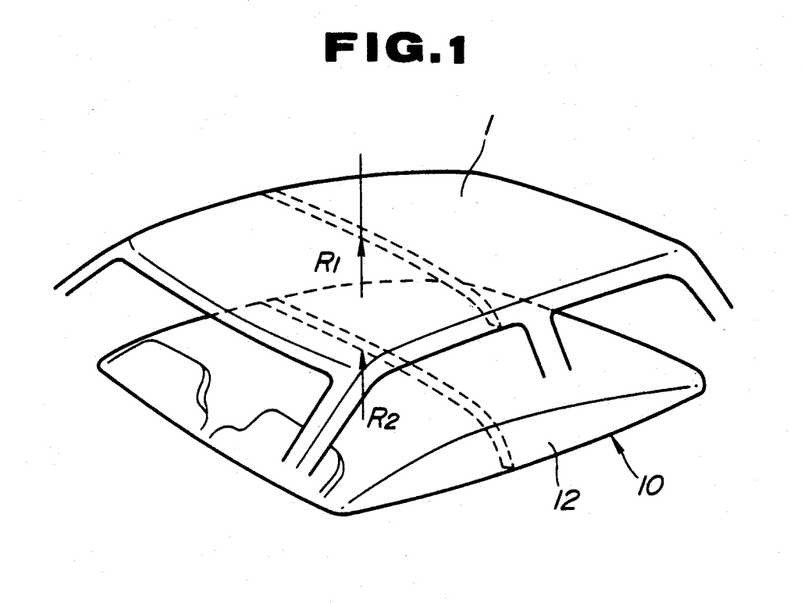
FIG. 1 is an exploded perspective view of a vehicular roof structure according to a first embodiment of the present invention, the view schematically showing the relationship between a roof panel and a roof lining.
Figure 2:
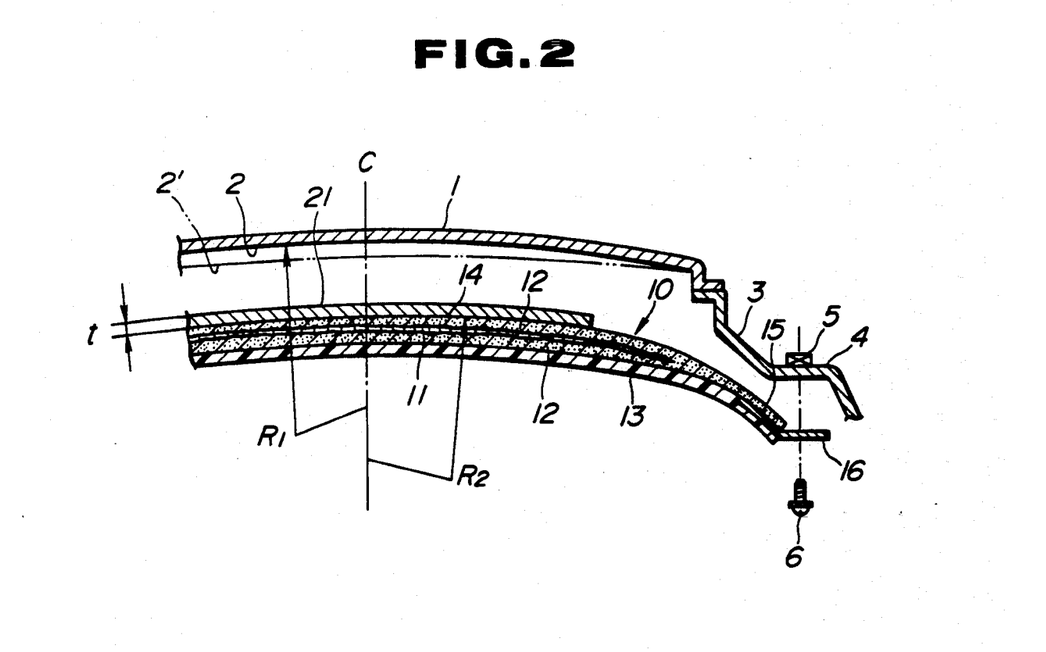
FIG. 2 is a fragmentary vertical cross-sectional view of the roof lining to be attached to the roof panel.

FIGS. 1 and 2 show a vehicular roof structure, for use in a motor vehicle, according to a first embodiment of the present invention.

As shown in FIG. 1, a roof lining 10 is attached, from below, to a vehicular roof panel 1, thus making up a vehicular roof. As illustrated in FIG. 2, the roof panel 1 has a lower surface 2 curved to have a radius $R_1$ of curvature in the transverse direction of the motor vehicle. Roof rails 3 are integrally joined to peripheral edges of the roof panel 1, the roof rails 3 serving as reinforcing frames for the roof panel 1. Each of the roof rails 3 has a flat plate 4 to which a suitable number of nuts 5 are welded. The roof panel 1 has a vertical central line C (FIG. 2).

The roof lining 10 is of a laminated structure comprising a support layer 11, a covering layer 12, and a decorative layer 13. A vibration-damping layer 21 is placed on the upper surface 14 of the roof lining 10.

The support layer 11, which serves as a core of the roof lining 10, is made of a highly rigid material such as relatively thick cardboard or phenol-impregnated paper, and has a cellular structure having many cells therein, such as a honeycomb structure. The upper and lower surfaces of the support layer 11 are fully covered with the covering layer 12, which is made of an air-permeable material such as cloth, e.g., resin felt, or glass wool, or phenol-impregnated cloth. The entire lower surface of the covering layer 12 is covered with the decorative layer 13 which is made of an air-permeable material such as tricot or warp-knitted fabric, nonwoven fabric, or porous resin sheet, for example.

The roof lining 10 is formed into the laminated structure by compressing the support layer 11, the covering layer 12, and the decorative layer 13 with a press, or bonding them together with an adhesive. The roof lining 10 has edges each flattened without the support layer 11 therein. The upper surface 14 of the roof lining 10 is of a curved shape having a radius $R_2$ of curvature in the transverse direction of the motor vehicle. An attachment plate 16 made of metal, hard resin, or the like is attached to each of peripheral edges 15 of the lining. Each attachment plate 16 is interposed between the covering layer 12 and the decorative layer 13, and fixed thereto by an adhesive, the attachment plate 16 projecting laterally as a flat plate from the roof lining 10.

The vibration-damping layer 21 is mounted on the upper surface 14 of the roof lining 10 except the peripheral edges 15 thereof. The vibration-damping layer 21 is made of an air-permeable, highly vibration-damping material with a high vibration-damping capability, such as asphalt-impregnated urethane foam or the like, the vibration-damping layer 21 having a uniform thickness t. The vibration-damping layer 21 may be formed integrally with the roof lining 10 when its layers are pressed or bonded to shape, or may independently be formed into a shape corresponding to that of the lining roof 10 and then bonded to the upper surface 14 thereof.

The radius $R_1$ of curvature of the lower roof panel surface 2, the radius $R_2$ of curvature of the upper roof lining surface 14, and the thickness t of the vibration-damping layer 21 are selected to meet the relationship $R_2 \leq R_1 - t$.

In order to obtain the radius $R_2$ of curvature which satisfies the above relationship, the roof lining 10 may be formed by press dies which have the same shape as that of the roof lining 10, or may be shaped by a jig.

The roof lining 10 is attached to the roof panel 1 with the vibration-damping layer 21 interposed between the roof lining 10 and the lower surface 2 of the roof panel 1, by placing the attachment plates 16 against the lower surfaces of the flat plates 4 of the roof rails 3 and tightening screws 6 into the respective nuts 5 on the flat plates 4.

With the roof lining 10 attached to the roof panel 1, the rigidity of the roof lining 10 itself is maintained by the honeycomb support layer 11. The air-permeable decorative and covering layers 13, 12 serve as sound-absorbing layers for absorbing or attenuating sounds in the passenger compartment.

By selecting the radii $R_1$, $R_2$ of curvature and the thickness t to meet the relationship: $R_2 \leq R_1 - t$ and fixing the peripheral edges 15 of the roof lining 10 to the roof panel 1, the roof lining 10 always exerts a force tending to push up the lower surface 2 of the roof panel 1, thereby holding the vibration-damping layer 21 closely against the lower surface 2 of the roof panel 1. The vibration-damping layer 21 held in intimate contact with the lower roof panel surface 2 suppresses vibrations of the roof panel 1, to thereby increase the rigidity of the entire roof.

Even if the lower surface roof panel 1 is deformed downwardly as indicated by the imaginary line 2' in FIG. 2 due to welding errors or warpage of the roof panel 1 itself, such deformation can be removed when the vibration-damping layer 21 is held closely against the roof panel 1.

While the covering layer 12 covers the upper and lower surfaces of the support layer 11 in the above embodiment, the covering layer may be arranged in covering relation to one of the upper and lower surfaces of the support layer 11. The peripheral edges 15 of the roof lining 10 may be attached to the roof panel 1 by means of clips, inserting members, or other suitable means, rather than the nuts 5 and the screws 6.

A vehicular roof structure according to a second embodiment will be described below with reference to FIGS. 3 through 7.

Figure 5:
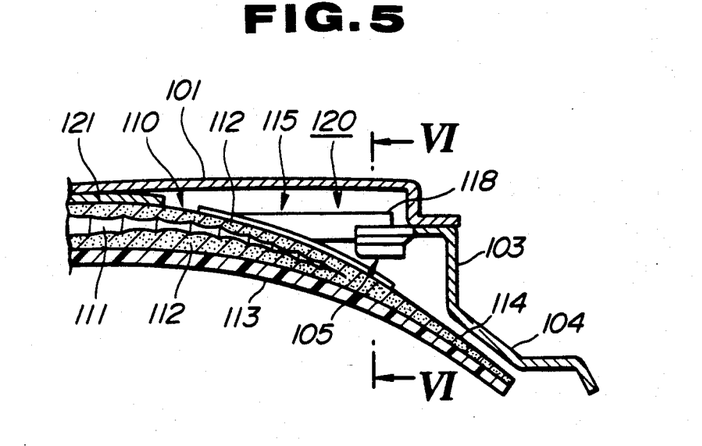
FIG. 5 is a fragmentary vertical cross-sectional view of the roof lining of FIG. 3 attached to the roof panel.

A roof lining 110 has a laminated structure which comprises a support layer 111, a covering layer 112, and a decorative layer 113. A vibration-damping layer 121 is placed on the upper surface of the laminated roof lining 110. The radii of curvature of the upper and lower surfaces of the roof lining 110 and a roof panel 101, respectively, and the thickness of the vibration-damping layer 121 are selected in the same manner as with the first embodiment described above.

Figure 3:
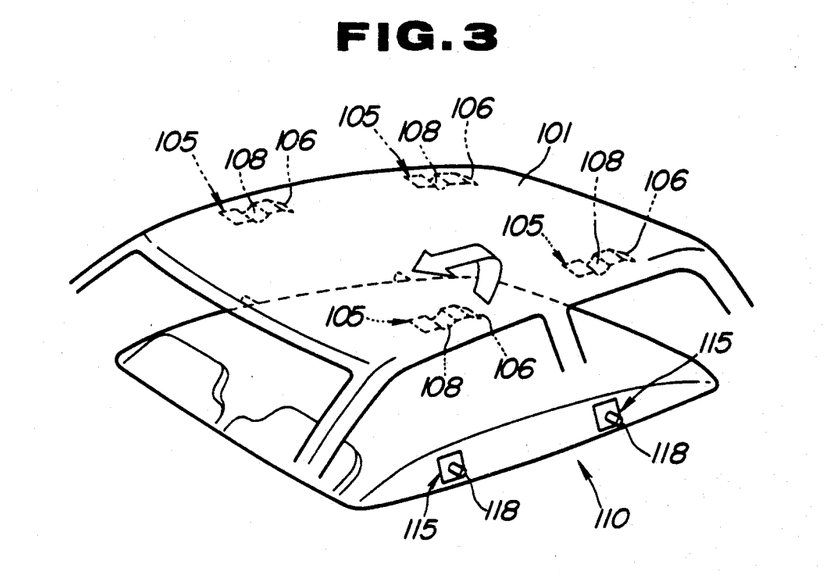
FIG. 3 is an exploded perspective view of a vehicular roof structure according to a second embodiment of the present invention, the view schematically showing the relationship between a roof panel and a roof lining.

In the second embodiment, slidable engaging/supporting mechanisms 120 are positioned between the roof panel 101 and the roof lining 110 at lateral sides thereof.

Figure 4:
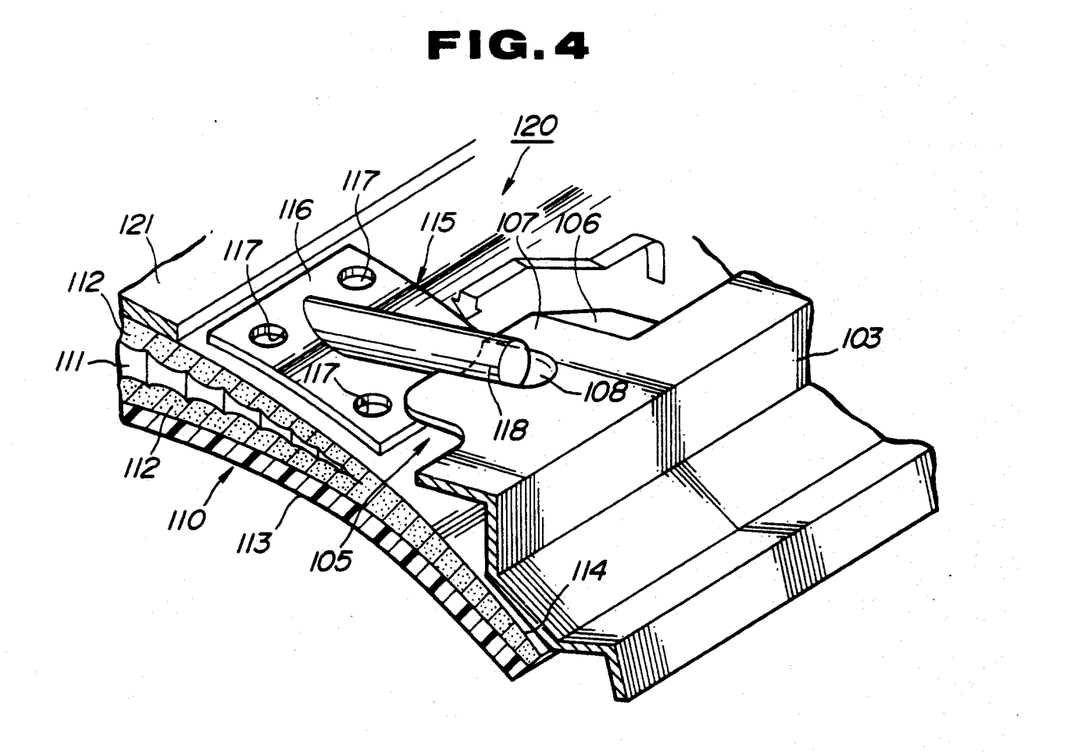
FIG. 4, is an enlarged fragmentary perspective view of an engaging/supporting mechanism.

Each of the engaging/supporting mechanisms 120 comprises a bracket 105 attached to the roof panel 101 and a bracket 115 attached to the roof lining 110. The bracket 105 is integrally formed with a roof rail 103, whereas the bracket 115 is integrally secured to the roof lining 110 near a terminal edge 114 thereof.

Figure 6:
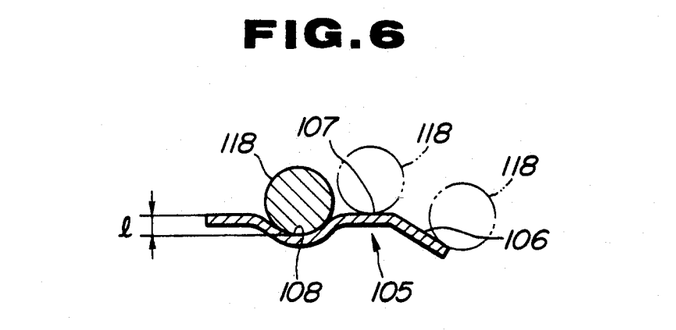
FIG. 6 is a cross-sectional view taken along line VI—VI of FIG. 5.

The bracket 105 is in the shape of a plate projecting substantially horizontally from an upper inner edge of the roof rail 103. As shown in FIG. 6, the bracket 105 has a rear sloping surface 106 rising smoothly from a rear edge toward a front edge thereof, and a flat surface 107 having a rear edge contiguously joined to the front edge of the sloping surface 106. The flat surface 107 has a retainer groove 108 defined centrally therein.

The bracket 115 is bonded to the upper surface of the roof lining 110 near the terminal edge 114 thereof. The bracket 115 comprises a square plate 116 having holes 117 defined respectively in its four corners, and an engaging rod 118 projecting substantially horizontally outwardly from the center of the plate 116.

In the illustrated embodiment, there are four brackets 105 located at lateral front and rear positions on the roof panel 101, and there are also four brackets 115 located at corresponding lateral front and rear positions on the roof lining 110.

Figure 7:
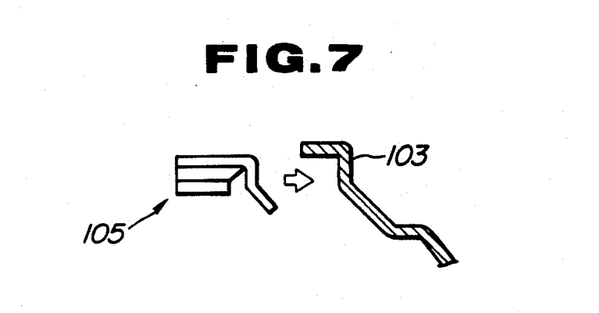
FIG. 7 is a fragmentary exploded cross-sectional view showing a separate roof panel bracket.
Figure 8:
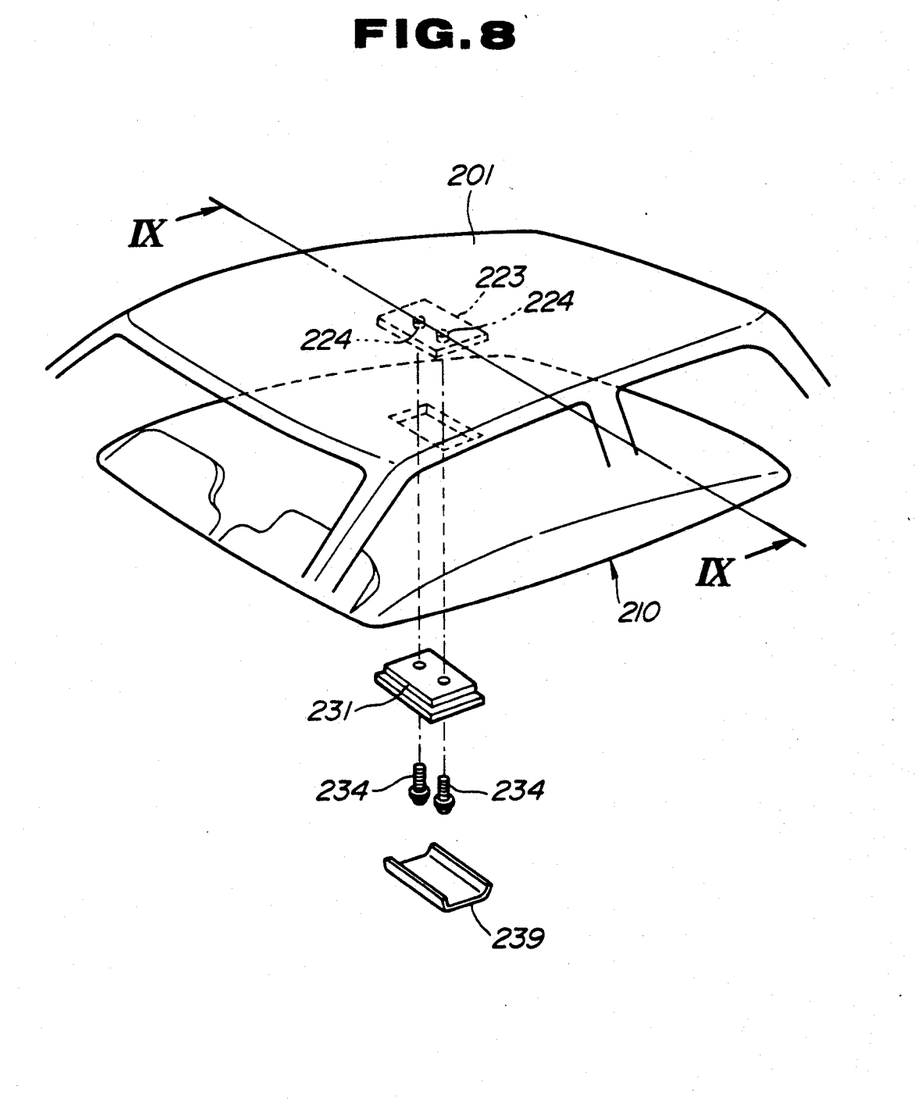
FIG. 8 is an exploded perspective view of a vehicular roof structure according to a third embodiment of the present invention, the view schematically showing the relationship between a roof panel and a roof lining.

The brackets 105, 115 are made of metal, hard resin, or the like. As shown in FIG. 7, the roof panel bracket 105 may be fabricated separately from the roof rail 103, and subsequently joined to the roof rail 103.

To install the roof lining 110 to the roof panel 101, the vibration-damping layer 121 is placed on and integrally joined to the upper surface of the laminated roof lining 110. Then, the roof lining 110 is positioned below the roof panel 101. Thereafter, the roof lining 110 is lifted and moved forwardly as indicated by the arrows in FIGS. 3 and 4 to guide the engaging rods 118 of the brackets 115 respectively along the sloping surfaces 106 of the corresponding brackets 105. The engaging rods 118 are further slid onto and moved on the flat surfaces 107 until the rods 118 are placed and locked in the respective retainer grooves 108.

At this time, the vibration-damping layer 121 is interposed under compression between the roof panel 101 and the roof lining 110. As shown in FIG. 6, each of the retainer grooves 108 has a depth l from the flat surface 107 to the bottom of the retainer groove 108, the depth l being smaller than the minimum interval by which the vibration-damping layer 121 can be compressed.

Each of the terminal edges 114 of the roof lining 110 may be detachably fixed to a slanted surface 104, for example, of the roof rail 103 by means of screws, clips, inserting members, or other suitable means, so as to be secured in place against undesirable wobbling movement.

When the roof lining 110 is installed on the roof panel 101, the vibration-damping layer 121 is held closely against and between the roof lining 110 and the roof panel 101.

The roof lining 110 can easily be detached from the roof panel 101 simply by pushing the engaging rods 118 upwardly out of the respective retainer grooves 108 and displacing the engaging rods 118 rearwardly along the surfaces 107, 106.

FIGS. 8 through 13 show a vehicular roof structure according to a third embodiment of the present invention.

Figure 9:
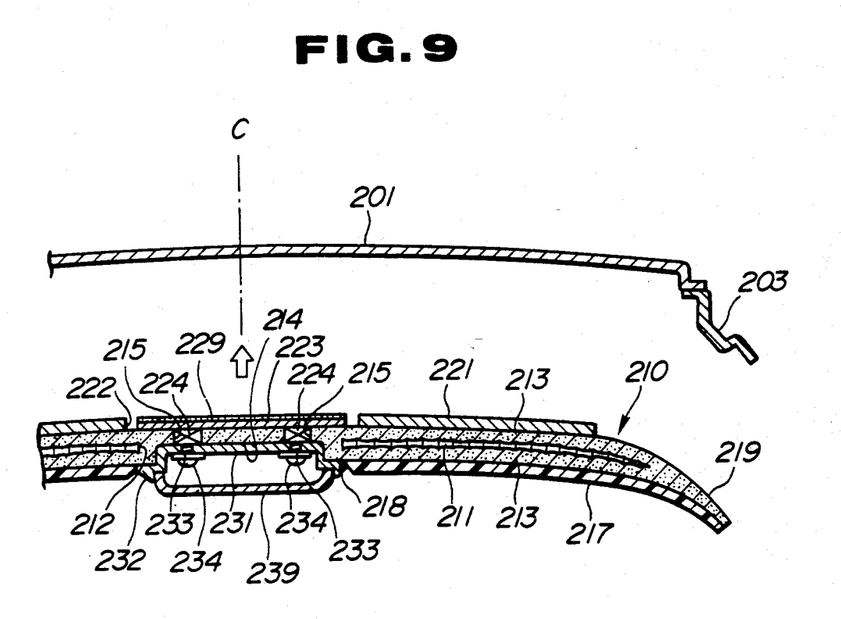
FIG. 9 is an enlarged fragmentary cross-sectional view taken along line IX—IX of FIG. 8, showing the roof lining to be attached to the roof panel.

A roof lining 210 has a laminated structure which comprises a support layer 211, a covering layer 213, and a decorative layer 217. A vibration-damping layer 221 is placed on the upper surface of the laminated roof lining 211.

In the third embodiment, the support layer 211 has an opening 212 defined therein at the center of the roof lining 210, the opening 212 being of a square shape, for example, as viewed in plan. The portion of the covering layer 213, which is positioned in the opening 212, has a square recess 214 defined in its lower surface, and also has a pair of holes 215 extending vertically therethrough.

The decorative layer 217 has an opening 218 through which the recess 214 is exposed downwardly.

The vibration-damping layer 221 is disposed on the upper surface of the roof lining 210 except at terminal edges 219 of the lining 210. The vibration-damping layer 221 has an opening 222 of a square shape, for example, which is defined centrally therein in surrounding relation to an attachment seat 223.

The attachment seat 223 is of a square shape and is in the form of a metal plate or a hard resin plate. Nuts 224 are welded or otherwise fixed to the lower surface of the attachment seat 223 for insertion in the holes 215, respectively. An adhesive layer 229 is mounted on the upper surface of the attachment seat 223. The adhesive layer 229 may be an acrylic or epoxy adhesive coating or an adhesive tape.

A base plate 231 for mounting a dome light (not shown) is fitted into the recess 214 from below the roof lining 210, and then screws 234 are threaded through respective holes 233 in the base plate 231 into the nuts 224, thereby attaching the attachment seat 223 to the upper central surface of the roof lining 210. The base plate 231 has peripheral edges 232 fitted in the opening 218, and a dome light cover 239 is detachably fitted in the peripheral edges 232. The total thickness of the attachment seat 223 and adhesive layer 229 is smaller than the thickness of the vibration-damping layer 221.

The laminated roof lining 210 with the attachment seat 223 and the vibration-damping layer 221 mounted on its upper surface is then pressed against the lower surface of a roof panel 201. The attachment seat 223 is bonded to the lower central surface of the roof panel 201 by the adhesive layer 229 while compressing the thick vibration-damping layer 221. The lateral terminal edges 219 of the roof lining 210 are detachably fixed to roof side rails 203 by means of screws (as shown in FIG. 2), clips, inserting members, or other suitable means.

Figure 10:
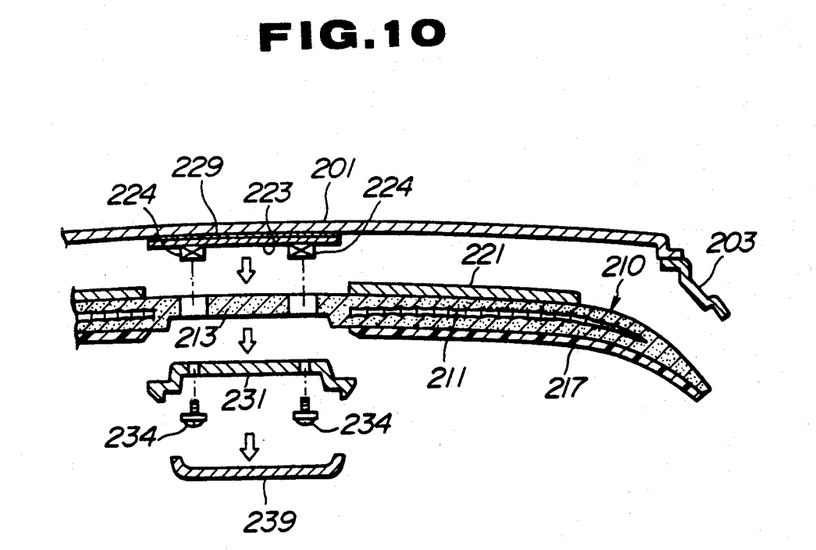
FIG. 10 is a fragmentary exploded cross-sectional view showing the manner in which the roof lining is detached.

The roof lining 210 can be removed as follows: As shown in FIG. 10, the dome light cover 239 is first detached, and the screws 234 are loosened off, removing the base plate 231. The roof lining 210 and the vibration-damping layer 221 are now separated from the attachment seat 223 which is joined to the roof panel 210 by the adhesive layer 229.

Figure 11:
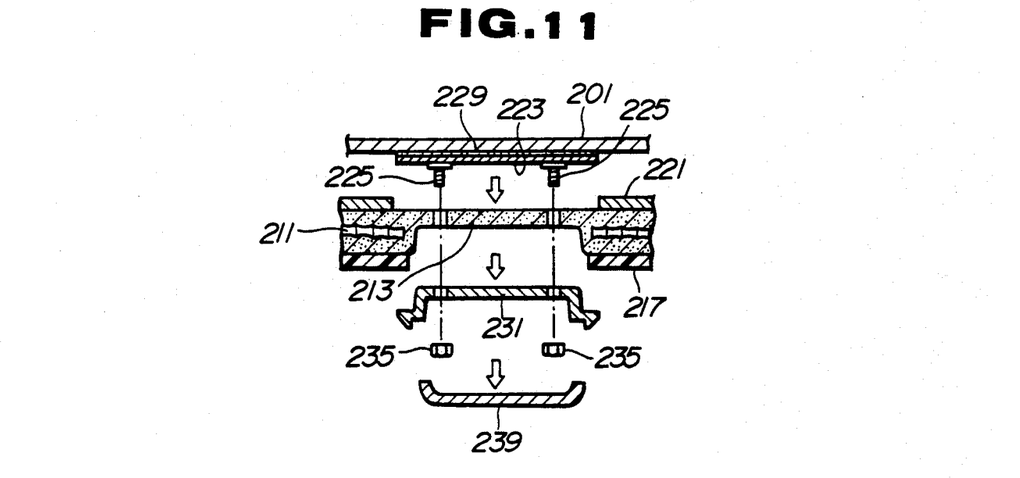
FIGS. 11 through 13 are fragmentary exploded cross-sectional views of different modifications of structures for attaching roof linings to roof panels.

FIG. 11 shows a modification in which screws 225 are integrally attached to the lower surface of the attachment seat 223. The base plate 231 and the roof lining 210 are attached to the attachment base 223 by means of nuts 235 threaded respectively over the screws 225, with the roof lining 210 sandwiched between the base plate 231 and the attachment seat 223.

Figure 12:
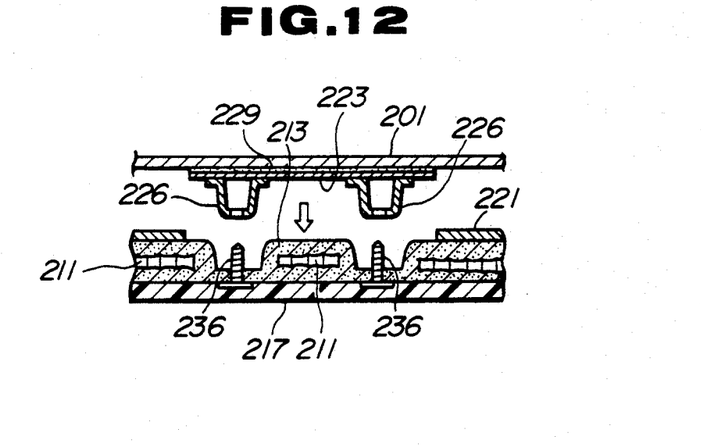

According to another modification shown in FIG. 12, clip retainers 226 are mounted on the lower surface of the attachment seat 223, and resin clips 236 partly embedded in the roof lining 210 are inserted in and retained by the clip retainers 226 to install the roof lining 210 to the roof panel 201.

Figure 13:
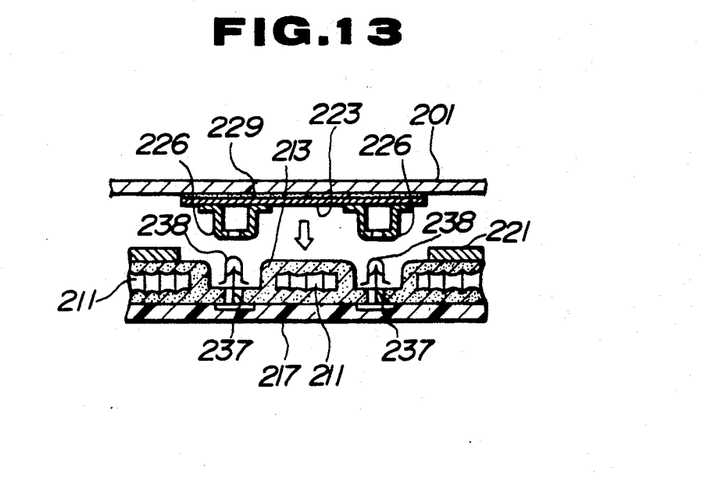

Still another modification shown in FIG. 13 has clip retainers 226 mounted on the lower surface of the attachment seat 223, and wedge-shaped metal clips 237 partly embedded in the roof lining 210 and inserted in and retained by the clip retainers 226 through metal caps 237, respectively.

In the modifications shown in FIGS. 12 and 13, the decorative layer 217 does not require any through opening and the portion of the covering layer 213 which lies between the clips 236, 237 is of an increased thickness.

The location of the attachment seat is not limited to the center of the roof panel, while a plurality of attachment seats may be disposed around the center of the roof panel.

With the present invention, as described above, the vehicular roof structure which is free of any roof arches is lightweight and capable of absorbing sounds directed toward the passenger compartment. Since the vibration-damping layer of the roof lining is held closely against the lower surface of the roof panel to push the roof panel upwardly at all times, the vibration-damping capability of the roof panel and the rigidity of the roof are higher than those of the conventional roof structures. Because the roof lining can easily be attached to and detached from the roof panel, the maintenance of the roof structure is easy inasmuch as the roof panel can be repaired and the roof lining can be replaced with ease.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

I claim:

1. A vehicular roof structure comprising:

a roof panel having reinforcing frames on peripheral edges thereof and a curved lower surface having a radius $R_1$ of curvature;

a roof lining having a crowd upper surface having a radius $R_2$ of curvature, said roof lining being of a laminated structure comprising a support layer having a plurality of cells, a covering layer covering at least one surface of said support layer, and a decorative layer disposed on a lower surface of said covering layer;

a vibration-damping layer having a substantially uniform thickness t and held between and closely against the upper surface of said roof lining and the lower surface of said roof panel;

said radii $R_1$, $R_2$ of curvature and said thickness t meeting the relationship: $R_2 \leq R_1 - t$ so that the roof lining normally urges said vibration damping layer against said roof panel; and said roof lining having peripheral edges secured to said reinforcing frames of said roof panel.

2. A vehicular roof structure according to claim 1, further including an attachment plate projecting laterally from each of said peripheral edges of said roof lining, said roof lining being attached to said reinforcing frames of the roof panel by said attachment plate.

3. A vehicular roof structure according to claim 2, wherein said attachment plate is fixedly interposed between the covering and decorative layers of said roof lining.

4. A vehicular roof structure according to claim 1, further including engaging/supporting mechanisms comprising engaging rods mounted on the upper surface of the roof lining near the peripheral edges thereof and projecting laterally, and brackets mounted on lateral edges of said reinforcing frames and positionally corresponding to said engaging rods, respectively, said brackets engaging and supporting said engaging rods, respectively.

5. A vehicular roof structure according to claim 4, wherein each of said brackets comprises a sloping surface for guiding one of said engaging rods, said sloping surface being slanted in a direction transverse to the direction in which the engaging rod projects laterally, and a flat surface having a retainer groove for retaining said engaging rod and extending contiguously from said sloping surface.

6. A vehicular roof structure according to claim 1, further including an attachment seat mounted on said roof lining and adapted to be bonded to the lower surface of said roof panel at the same time that said roof lining is attached to said roof panel, and fastening means for being detachably attached to said attachment seat with said roof lining interposed between said attachment seat and said fastening means.

7. A vehicular roof structure according to claim 1, wherein said roof lining is shaped to substantially entirely cover said lower surface of said roof panel.

8. A vehicular roof structure comprising:

a roof panel means having a curved lower surface with a radius $R_1$ of curvature;

a laminated roof lining means having a curved upper surface with a radius $R_2$ of curvature and secured to said roof panel means; and a vibration-damping means having a substantially uniform thickness t and held between and closely against the upper surface of said laminated roof lining means and the lower surface of said roof panel means;

said radii $R_1$, $R_2$ of curvature and said thickness t meeting the relationship $R_2 \leq R_1 - t$ so that the roof lining means normally urges said vibration damping means against said roof panel means.

9. A vehicular roof structure according to claim 8, wherein:

said roof panel means includes reinforcing frames on peripheral edges thereof; and said roof structure further comprises means for securing peripheral edges of said laminated roof lining means to said reinforcing frames of said roof panel means.

10. A vehicular roof structure according to claim 7, wherein said laminated roof lining means is shaped to substantially entirely cover said lower surface of said roof panel means.

* * * * *

UNITED STATES PATENT AND TRADEMARK OFFICE
CERTIFICATE OF CORRECTION

PATENT NO. : 5,120,593
DATED : June 9, 1992
INVENTOR(S) : Toshiyuki Kurihara It is certified that error appears in the above-identified patent and that said Letters Patent is hereby corrected as shown below:

Column 6, line 34, change "237" to --238--.

Column 7, line 4 (Claim 1, line 5), change "crowd" to --curved--;
Column 7, line 17 (Claim 1, line 18), change "vibration damping" to --vibration-damping--.

Signed and Sealed this

Thirteenth Day of July, 1993

Attest:

MICHAEL K. KIRK

*Attesting Officer*   Acting Commissioner of Patents and Trademarks